(12) United States Patent
Cheon et al.

(10) Patent No.: US 9,077,536 B2
(45) Date of Patent: Jul. 7, 2015

(54) METHOD AND APPARATUS FOR SOLVING DISCRETE LOGARITHM PROBLEM USING PRE-COMPUTATION TABLE

(75) Inventors: Jung Hee Cheon, Gwacheon-si (KR); Hyung Tae Lee, Seoul (KR); Jin Hong, Seoul (KR)

(73) Assignees: SAMSUNG SDS CO., LTD., Seoul (KR); SNU R&DB FOUNDATION, Seoul (KR)

( * ) Notice: Subject to any disclaimer, the term of this patent is extended or adjusted under 35 U.S.C. 154(b) by 536 days.

(21) Appl. No.: 13/358,674

(22) Filed: Jan. 26, 2012

(65) Prior Publication Data

US 2012/0311005 A1 Dec. 6, 2012

(30) Foreign Application Priority Data

May 31, 2011 (KR) ........................ 10-2011-0052389

(51) Int. Cl.
 *G06F 7/72* (2006.01)
 *H04L 9/30* (2006.01)
(52) U.S. Cl.
 CPC .............. *H04L 9/3013* (2013.01); *G06F 7/724* (2013.01); *H04L 2209/38* (2013.01)
(58) Field of Classification Search
 None
 See application file for complete search history.

(56) References Cited

U.S. PATENT DOCUMENTS 5,854,759 A * 12/1998 Kaliski et al. ................. 708/492
5,987,131 A * 11/1999 Clapp ............................ 713/171
2007/0071237 A1 * 3/2007 Brown et al. .................... 380/30
2009/0006511 A1 * 1/2009 Ozturk et al. .................. 708/205
2012/0311005 A1 * 12/2012 Cheon et al. ................... 708/235
2013/0064367 A1 * 3/2013 Struik et al. ..................... 380/44

FOREIGN PATENT DOCUMENTS

| JP | 2010539633 A | 12/2010 |
|---|---|---|
| KR | 20030028746 A | 4/2003 |
| WO | 2009039316 A2 | 3/2009 |

OTHER PUBLICATIONS

Communication dated Apr. 10, 2012 issued by the Korean Intellectual Property Office in Korean Application No. 10-2011-0052389.
A. Miyaji, et al., "New explicit conditions of elliptic curve traces for FR-reduction", TIEICE: IEICE Trans. on Communications/Electronics/Information and Systems E84-A (2001) 1234-1243.
C. P. Schnorr et al., "A Monte Carlo factoring algorithm with linear storage", Mathematics of Computation 4:3 (1984) 289-311.
D. E. Knuth, The art of computer programming—Seminumerical algorithms,—vol. 2, Addison-wesley publishing company, second edition, 1981, 12 pages.

(Continued)

*Primary Examiner* — David H Malzahn
(74) *Attorney, Agent, or Firm* — Sughrue Mion, PLLC

(57) ABSTRACT

A method and apparatus for computing a discrete logarithm using a pre-computation table are provided. The method includes previously generating the pre-computation table consisting of chains of function values obtained by applying an iterating function to a predetermined number of initial values having a generator of the cyclic group as a base and having different exponents; and if a function value obtained by applying the iterating function to a value having a target element as a base and having an exponent is identical to a function value stored in the pre-computation table, computing the discrete logarithm of the target element by using exponent information of the two function values.

12 Claims, 3 Drawing Sheets

(56) References Cited

OTHER PUBLICATIONS

E. Teske, "On random walks for Pollard's rho method", Mathematics of Computation 70 (2001) 809-825.

E. Teske, "Speeding up Pollard's rho method for computing discrete logarithms", in: J. Buhler (Ed.), Algorithmic Number Theory ,Third International Symposium, ANTS-III, LNCS 1423, Springer, 1998, pp. 541-554.

F. Kuhn, et al., "Random walks revisited: extensions of Pollard's rho algorithm for computing multiple discrete logarithms", in: S. Vaudenay, A. M. Youssef (Eds.), Selected Areas in Cryptography 2001. LNCS 2259, Springer, 2001, pp. 212-229.

G. Nivasch, "Cycle detection using a stack", Information Processing Letters 90 (2004) 135-140.

J. H. Cheon, et al., Speeding up the Pollard rho method on prime fields, in: J. Pieprzyk (Ed.), Ad-vances in Cryptology—ASI-ACRYPT 2008, LNCS 5350, Springer, 2008, pp. 471-488.

J. Hong, et al., "A comparison of cryptanalytic tradeoff algorithms", Cryptology ePrint Archive, Report 2010/176, 2010, 52 pages.

J. M. Pollard, "Theorems of factorization and primality testing", Cambridge Philosophical Society 76 (1974) 521-528.

J. Sattler, et al., Generating random walks in groups, Ann. Univ. Sci. Budapest. Sect. Comput. 6 (1985) 65-79.

J.-J. Quisquater, et al., "How easy is collision search. New results and applications to DES", in: G. Brassard (Ed.), Advances in Cryptology—CRYPT°, LNCS 435, Springer, 1989, pp. 408-413.

K. G. Paterson, et al., "On the relations between non-interactive key distribution, identity-based encryption and trapdoor discrete log groups", Designs, Codes and Cryptography 52 (2009) 219-241.

M. J. Wiener et al., "Faster attacks on elliptic curve cryptosystems", in: Selected Areas in Cryptography '98, vol. 1556 of LNCS, Springer, 1999, pp. 190-200.

M. Kim, et al., "Subset-restricted random walks for Pollard rho method on Fp"., in: Public Key Cryptography 2009, vol. 544:3 of LNCS, Springer, 2009, pp. 54-67.

N. Koblitz, "CM-curves with good cryptographic properties", in: J. Feigenbaum (Ed.), Advances in Cryptology—CRYPTO '91,—vol. 576 of LNCS, Springer, 1992, pp. 279-287.

National Institute of Standards and Technology, "Digital signature standard (DSS)", 2009. FIPS PUB 186-3, 130 pages.

P. C. van Oorschot, et al., "Parallel collision search with cryptanalytic applications", Journal of Cryptology 12 (1999) 1-28.

R. P. Brent, "An improved Monte Carlo factorization algorithm", BIT 20 (1980) 176-184.

R. Sedgewick, et al., A. C. Yao, The complexity of finding cycles in periodic functions, SIAM Journal on Computing 11 (1982) 376-390.

R.. Gallant, et al., "Improving the parallelized Pollard lambda search on anomalous binary curves", Mathematics of Computation 69 (2000) 1699-1705.

S. C. Pohlig, et al., "An improved algorithm for computing logarithms over GF(p) and its cryptographic significance", IEEE Transactions on Information Theory 24 (1978) 106-110.

U. M. Maurer et al., "Non-interactive public-key cryptography", in: D. W. Davies (Ed.), Advances in Cryptology—EUROCRYPT '91. LNCS 547, Springer, 1991, pp. 498-507.

V. Shoup, "NTL: A library for doing number theory", ver 5.5, 2009. http://www.shoup.net/rit1/, 1 page.

Y. Hitchcock, et al., The efficiency of solving multiple discrete logarithm problems and the implications for the security of fixed elliptic curves, International Journal of Information Security 3 (2004) 86-98.

D. Shanks, "Class Number, A Theory of Factorization, and Genera", Symposia in Pure Mathematics, vol. 20, Proceedings of the 1969 Summer Institute on Number Theory: Analytic Number Theory, Diophantine Problems, and Algebraic Number Theory, Jul. 7-Aug. 1, 1969, published 1971, previously presented, pp. 415-440.

\* cited by examiner

METHOD AND APPARATUS FOR SOLVING DISCRETE LOGARITHM PROBLEM USING PRE-COMPUTATION TABLE

CROSS-REFERENCE TO RELATED PATENT APPLICATION

This application claims priority from Korean Patent Application No. 10-2011-0052389, filed on May 31, 2011, in the Korean Intellectual Property Office, the disclosure of which is incorporated herein in its entirety by reference.

BACKGROUND

1. Field

Exemplary embodiments relate to a method and apparatus for solving a discrete logarithm problem, and more particularly, to a method and apparatus for efficiently solving a discrete logarithm problem that can be widely used in a public key encryption system using a pre-computation table.

2. Description of the Related Art

A public key encryption system calculates a public key and a secret key by using a one-way function that is difficult to solve mathematically. The public key is publicized for anyone to access, whereas the secret key is kept and may be accessed only by users who keep the secret key. Thus, a user who has the publicized public key of the other party can secretly communicate with the other party.

The most common problem in the public key encryption system is a discrete logarithm problem. The discrete logarithm problem defined on a finite field will now be briefly described.

A cyclic group G is a set consisting of remainders in division of a finite field $Z_p$ by a prime p under multiplication modulus. More specifically, all elements of the finite field $Z_p$ can be generated by iterative multiplication. If g is a generator of the cyclic group G of order q of a multiplication group $Z_p^*$ of the finite field $Z_p$, an element of the cyclic group G is in the form of $g^k$ mod p for a number k ($0 \le k <$ (order of G)).

Therefore, the discrete logarithm problem defined in the finite field $Z_p$ is to find the number k satisfying $y = g^k$ mod p when an element y is given. This is known as a problem that is difficult to be solved computationally with respect to a sufficiently large p. Thus, public key encryption systems of various forms may be designed by using k as a user's secret key and using $y = g^k$ mod p as a public key corresponding to the user's secret key k.

SUMMARY

The exemplary embodiments provide a method and apparatus for efficiently solving a discrete logarithm problem using a pre-computation table, and a method and apparatus for generating the pre-computation table.

According to an aspect of the exemplary embodiments, there is provided a method of computing a discrete logarithm using a pre-computation table, the method comprising: setting p−1 and q−1 so that each p−1 and q−1 has at least one prime factor larger than B and N=pq is used as modulus and both p and q are primes; generating the pre-computation table consisting of chains of function values obtained by applying an iterating function to a predetermined number of initial values having a generator of the cyclic group as a base and having different exponents; and if a function value obtained by applying the iterating function to a value having a target element as a base and having an exponent is identical to a function value stored in the pre-computation table, computing the discrete logarithm of the target element by using exponent information of the two function values According to another aspect of the exemplary embodiments, there is provided an apparatus for computing a discrete logarithm, the apparatus comprising: a pre-computation table consisting of some points of chains of function values obtained by applying an iterating function to a predetermined number of initial values having a generator of the cyclic group as a base and having different exponents; and a discrete logarithm calculating unit for setting p−1 and q−1 as multiplications of a prime factor of a predetermined number of B-smooth numbers and other prime factors smaller than a B/2-smooth number in a cyclic group having N=pq (where p and q are prime numbers) as modulo, and, if a function value obtained by applying the iterating function to a value having a target element as a base and having an exponent is identical to a function value stored in the pre-computation table, computing the discrete logarithm of the target element using exponent information of the two function values.

According to another aspect of the exemplary embodiments, there is provided a method of generating a pre-computation table used to compute a discrete logarithm, the method comprising: setting a predetermined number of initial values having a generator of a cyclic group as a base and having different exponents; iteratively performing a process of obtaining function values by applying an iterating function to the initial values until the function values correspond to previously set distinguished points; and storing the function values corresponding to the previously set distinguished points and exponents of the function values in the pre-computation table.

According to another aspect of the exemplary embodiments, there is provided an apparatus for generating a pre-computation table, the apparatus comprising: an initial value generating unit for setting a predetermined number of initial values having a generator of a cyclic group as a base and having different exponents; a function value calculating unit for obtaining function values by applying an iterating function to the initial values; a distinguished point determining unit for, if the function values correspond to previously set distinguished points, storing the function values and exponents of the function values in the pre-computation table

BRIEF DESCRIPTION OF THE DRAWINGS

The above and other aspects will become more apparent by describing in detail exemplary embodiments thereof with reference to the attached drawings in which.

DETAILED DESCRIPTION OF THE EXEMPLARY EMBODIMENTS

The method and apparatus for efficiently solving a discrete logarithm problem using a pre-computation table according to the exemplary embodiments will now be described more fully with reference to the accompanying drawings, in which exemplary embodiments are shown.

Figure 1:
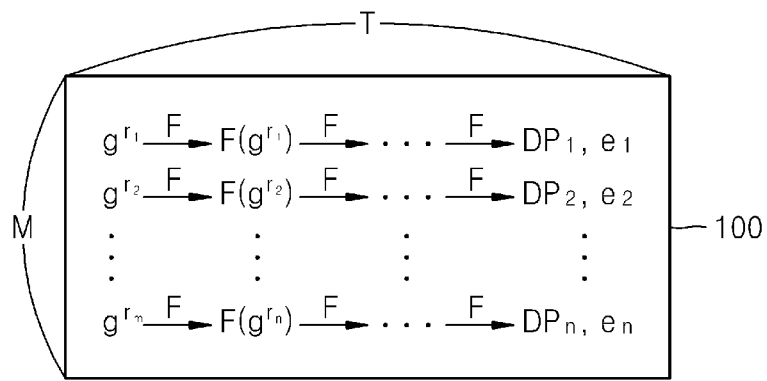
FIG. 1 illustrates a pre-computation table used to solve a discrete logarithm problem, according to an exemplary embodiment.

FIG. 1 illustrates a pre-computation table 100 used to solve a discrete logarithm problem, according to an exemplary embodiment.

Referring to FIG. 1, the pre-computation table 100 is a table that stores an end point of a chain of function values obtained by setting elements $g^{r1}, g^{r2}, g^{r3}, \ldots$ of a finite cyclic group G as initial values and applying an iterating function to the initial values.

The initial values are values having predetermined different numbers that use a generator g of the cyclic group G as a base and have exponents r1, r2, r3, . . . . The pre-computation table 100 may store a distinguished point (DP) rather than all elements of a chain. In this regard, the DP and exponent information "e" may be stored together. The DP may be set as a value exhibiting a predetermined pattern, for example, exhibiting 0 as a predetermined number of most significant bits.

The iterating function used in the pre-computation table 100 is a function where resultant values obtained by iterative applications of the elements $g^{r1}, g^{r2}, g^{r3}, \ldots$ of the finite cyclic group G are cycled, for example, a related art r-adding walk iterating function.

More specifically, with regard to a related art Pollard rho algorithm, if a function is iteratively applied to finite group elements, values obtained after some steps of iterating applications are consistent with previously generated values, and thus a chain structure in which function values are cycled is implemented. That is, a function $F:G \times Z_q \times Z_q \rightarrow G \times Z_q \times Z_q$ is defined according to Equation 1 below.

$$F(g_i, a_i, b_i) = (g_{i+1}, a_{i+1}, b_{i+1})$$ [Equation 1]

In this regard, $g_i = g^{a_i} h^{b_i}$ (all i>0).

If $g_i = g_j$, a discrete logarithm may be found by using a relation of $a_i + b_i x \equiv a_j + b_j x$ mod q.

The r-adding walk iterating function is defined to divide the finite cyclic group G into sub-groups r of the same size, and effectively compute an index function $s: G \times Z_q \times Z_q \rightarrow G \times Z_q \times Z_q$ as a pre-image uniform. Then, an r pair $(u_i, v_i) \in Z_q \times Z_q$ is selected, and an r multiplier $M_i$ for $g^{u_i} h^{v_i}$ is set.

The r-adding walk iterating function $F_r: G \times Z_q \times Z_q \rightarrow G \times Z_q \times Z_q$ is defined according to Equation 2 below.

$$F_r(y, a, b) = (y \cdot M_{s(y)}, a + u_{s(y)}, b + v_{s(y)})$$ [Equation 2]

In this regard, $y = g^a h^b$.

Since the pre-computation table 100 must be previously computed when a target element h is not given, the r-adding walk whose multipliers have the form $g^{u_i} h^0$ may be used.

A time taken to generate the pre-computation table 100 is a multiplication (i.e., M*T) of a number M of each chain and a time T taken for an iterating function of each chain to reach the DP. The greater the size of the pre-computation table 100, the shorter the time taken to solve the discrete logarithm problem. Also, the greater the size of the pre-computation table 100, the greater the size of a memory required, as well as the longer the time taken to generate the pre-computation table 100. Thus, the size of the pre-computation table 100 is determined with respect to the time taken to solve the discrete logarithm problem.

Figure 2:
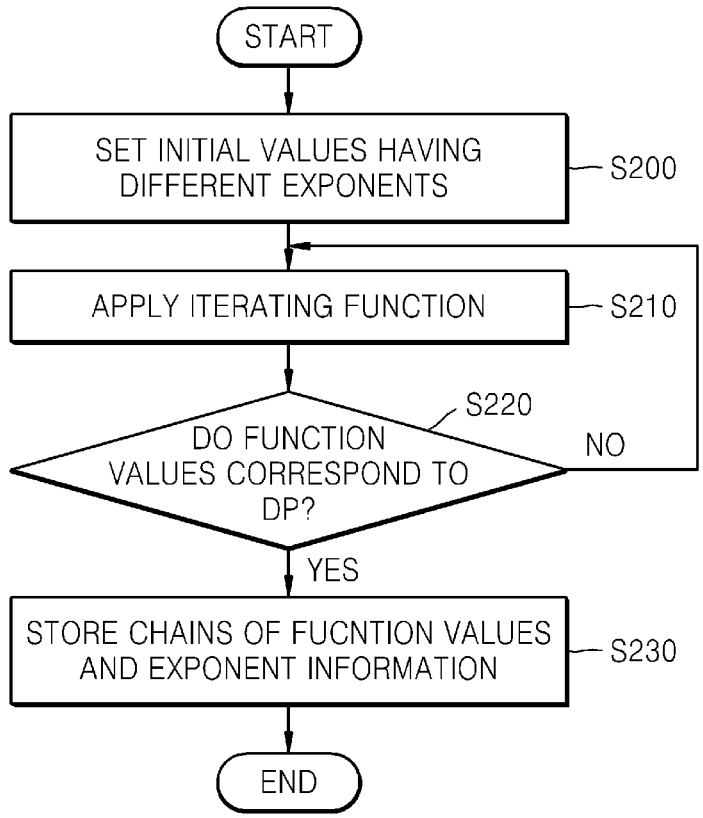
FIG. 2 is a flowchart illustrating a method of generating a pre-computation table, according to an exemplary embodiment.
Figure 3:
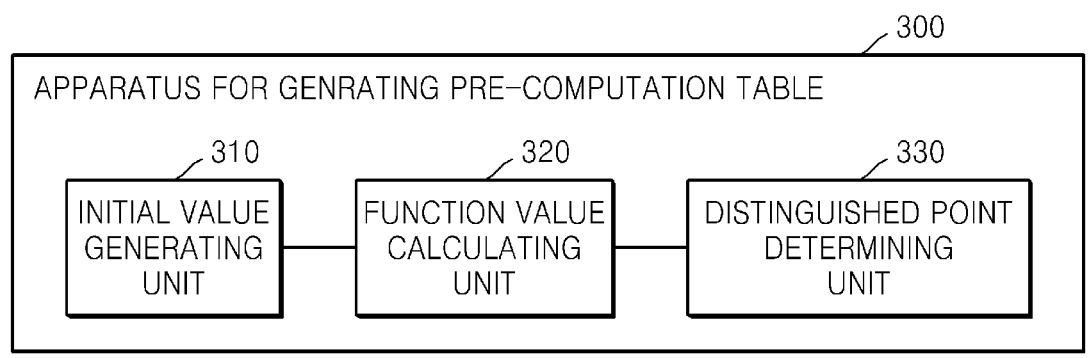
FIG. 3 is a block diagram illustrating an apparatus for generating a pre-computation table, according to an exemplary embodiment.

FIG. 2 is a flowchart illustrating a method of generating a pre-computation table, according to an exemplary embodiment. FIG. 3 is a block diagram illustrating an apparatus for generating the pre-computation table, according to an exemplary embodiment.

Referring to FIGS. 2 and 3, an initial value setting unit 310 sets initial values for generating the pre-computation table (operation S200). Initial values may be configured as different values that use the generator g of the cyclic group G as a base and to have different exponents.

A function calculating unit 320 calculates function values by applying an iterating function to the initial values (operation S210). A DP determining unit 330 determines whether the function value calculated by the function calculating unit 320 is DP (operation S220), and, if the function value is not DP, calculates another function value by applying the iterating function to the previous function value through the function calculating unit 320.

If the function value calculated by the function calculating unit 320 reaches a DP (operation S220), the DP determining unit 330 determines whether the function value is stored in the pre-computation table, if the function value is previously stored in the pre-computation table, discards the function value, and, if the function value is not stored in the pre-computation table, stores the function value and exponent information "e" in the pre-computation table.

In a case where a value of the iterating function may not reach a DP, an infinite loop iterating function may be applied. To prevent this, the function calculating unit 320 previously sets a number of applications of the iterating function, and, if the iterating function is computed exceeding the set number, discards a corresponding initial value.

Figure 4:
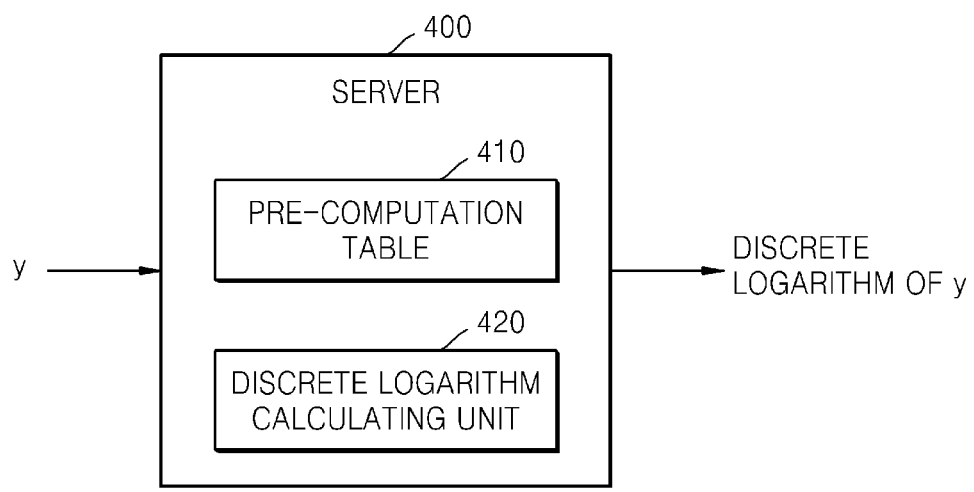
FIG. 4 is a diagram illustrating an apparatus for computing a discrete logarithm using a pre-computation table, according to an exemplary embodiment.
Figure 5:
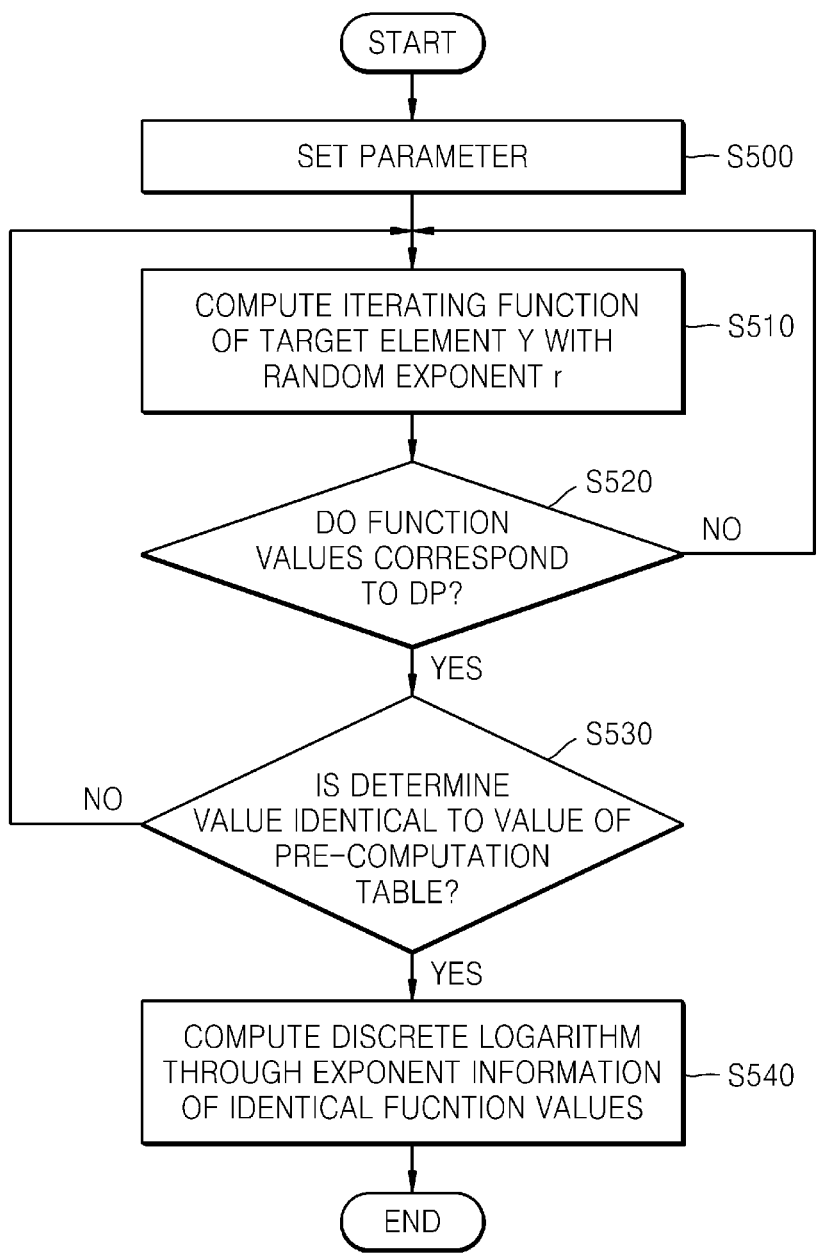
FIG. 5 is a flowchart illustrating a method of computing a discrete logarithm using a pre-computation table, according to an exemplary embodiment.

FIG. 4 is a diagram illustrating an apparatus 400 for computing a discrete logarithm using a pre-computation table 410, according to an exemplary embodiment. FIG. 5 is a flowchart illustrating a method of computing a discrete logarithm using a pre-computation table 410, according to an exemplary embodiment.

Referring to FIGS. 4 and 5, the apparatus 400 for computing the discrete logarithm previously includes the pre-computation table 410. A discrete logarithm calculating unit 420 sets the finite cyclic group G as a sub-group having the greatest order of a multiplicative group $Z_N$. In this regard, the discrete logarithm calculating unit 420 sets parameter N of the finite cyclic group G as a multiplication of a prime number having a predetermined number of B-smooth numbers and a prime number smaller than a B/2-smooth number (operation S500). For example, the parameter N may be set according to Equation 3 below.

$$N = p*q$$

$$p - 1 = 2p_1 p_2 \ldots p_r$$

$$q - 1 = 2q_1 q_2 \ldots q_s$$ [Equation 3]

In this regard, prime numbers $p_1, p_2, q_1, q_2$ are larger than B and other numbers are smaller than $\sqrt{B}$, and B is 80 bits.

Although prime numbers each have two numbers larger than B with respect to p−1 and q−1 in the present exemplary embodiment, they may have more than two numbers larger than B.

If the target element y is given, the discrete logarithm calculating unit 420 changes the discrete logarithm problem $y = g^x$ mod N according to Equation 4 below in order to solve the discrete logarithm problem $y = g^x$ mod N.

$$y^{\frac{p-1}{p_i}} = g^{x \frac{p-1}{p_i}} \bmod p$$

$$y^{\frac{q-1}{q_i}} = g^{x \frac{q-1}{q_i}} \bmod q$$ [Equation 4]

In this regard, $p_i$ and $q_i$ are prime numbers respectively consisting of p−1 and q−1 of Equation 4 above.

The discrete logarithm calculating unit 420 sets a value having $$y' = y^{\frac{p-1}{p_i}}$$

of Equation 4 above as a base, and having an exponent as an initial value, and applies an iterating function to the initial value with respect to the prime number $p_i$ (operation S510). If a value of the iterating function for y' reaches a DP used to generate the pre-computation table 100 of FIG. 1 (operation S520), the discrete logarithm calculating unit 420 determines whether the DP is stored in the pre-computation table 410 (operation S530). If the DP is not stored in the pre-computation table 410, the discrete logarithm calculating unit 420 changes the exponent and applies the iterating function to the prime number $p_i$ again. If pre-computation table 410 includes a function value identical to the DP obtained from the y', the discrete logarithm calculating unit 420 may compute the discrete logarithm using an exponent relation of the identical two function values, and a result of the computation is shown in Equation 5 below. Related art methods may be applied to a process of computing the discrete logarithm using the exponent relation of the identical two function values, and thus a detailed description regarding the result of computation according to Equation 5 will be omitted here.

$$x \bmod p_i, x \bmod q_i \qquad \text{[Equation 5]}$$

After the result is obtained from Equation 5 regarding all prime numbers $p_i$ and $q_i$ consisting of p−1 and q−1, the discrete logarithm calculating unit 420 applies a Chinese remainder theorem (CRT) to all resultant values and computes the discrete logarithm with respect to the target function y according to Equation 6 below (operation S540).

$$x \bmod \frac{\Phi(N)}{2}, \qquad \text{[Equation 6]}$$

In this regard, $\Phi(N)=(p-1)(q-1)$

The exemplary embodiments may be applied to a process of generating a secret key in ID-based encryption. For example, in the ID-based encryption using ID information of a terminal as a public key, the apparatus 400 for computing the discrete logarithm may act as a key sever that generates a secret key corresponding to the public key and transmits the secret key to the terminal.

According to the above exemplary embodiments, a time taken to solve a discrete logarithm problem can be reduced by using multiplications of prime factors including a predetermined number of numbers larger than B as parameters of a discrete logarithm group. The time can also be reduced by generating a pre-computation table before the discrete logarithm problem is given.

The one or more exemplary embodiments may be embodied as a computer readable recording medium on which commands, e.g., a program module, that may be executed by a computer are recorded. The computer readable recording medium may be any of media that may be accessed by a computer, e.g., a volatile medium, a non-volatile medium, a detachable medium, and a non-detachable medium. A computer readable recording medium can be transitory or non-transitory. Also, the computer readable medium may be a computer storage medium or a communication medium. Examples of the computer storage medium may include a volatile medium, a non-volatile medium, a detachable medium, and a non-detachable medium that employs a method or technology for storing computer readable commands, data structures, program modules, or other data. In general, examples of the communication medium may store computer readable commands, data structures, program modules, data contained in a modulated data signal, and other transmission mechanisms (e.g., transitory medium). The communication medium may be any information transfer media.

While the application has been particularly shown and described with reference to exemplary embodiments thereof, it will be understood by those of ordinary skill in the art that various changes in form and details may be made therein without departing from the spirit and scope of the exemplary embodiments as defined by the following claims.

What is claimed is:

1. A method, performed by a server, of generating a pre-computation table and computing a discrete logarithm based on the pre-computation table, the method comprising:
   setting, by a controller of the server, p−1 and q−1 so that each p−1 and q−1 has at least one prime factor larger than B bits and N=pq is used as a modulus in the computing of the discrete logarithm, and both p and q are primes;
   generating, by the controller of the server, the pre-computation table consisting of chains of function values obtained by applying an iterating function to a predetermined number of initial values having a generator of the cyclic group as a base and having different exponents; and
   if a first function value obtained by applying the iterating function to a value having a target element as a base and having an exponent is identical to a second function value stored in the pre-computation table, computing the discrete logarithm of the target element by using exponent information of the first function value and the second function value,
   wherein the B bits are a predetermined number of bits relating to a secret key.

2. The method of claim 1, wherein each of the chains of the function values of the pre-computation table is stored until a function value having a predetermined number of most significant bits as 0 starting from an initial value is reached.

3. The method of claim 2, wherein the computing of the discrete logarithm comprises: if the function value having a predetermined number of most significant bits as 0 is obtained by iteratively applying the iterating function to the value having the target element as the base and having the exponent, determining whether the pre-computation table stores the function value identical to the function value.

4. The method of claim 1, wherein the computing of the discrete logarithm comprises: if the pre-computation table does not store the function value identical to the function value obtained by iteratively applying the iterating function to the value having the target element as the base and having the exponent, changing an exponent of the target element and repeating the computing of the discrete logarithm.

5. An apparatus for generating a pre-computation table and computing a discrete logarithm based on the pre-computation table, the apparatus comprising:
   a pre-computation table which consists of chains of function values obtained by applying an iterating function to a predetermined number of initial values having a generator of the cyclic group as a base and having different exponents; and a discrete logarithm calculator which sets p−1 and q−1 so that each p−1 and q−1 has at least one prime factor larger than B bits and N=pq is used as a modulus in the computing of the discrete logarithm, and both p and q are primes, and, if a first function value obtained by applying the iterating function to a value which has a target element as a base and which has an exponent is identical to a second function value stored in the pre-computation table, computing the discrete logarithm of the target element using exponent information of the first function value and the second function value, wherein the B bits are a predetermined number of bits relating to a secret key.

6. A method, performed by a server, of generating a pre-computation table used to compute a discrete logarithm, the method comprising:

setting, by a controller of the server, a predetermined number of initial values having a generator of a cyclic group as a base and having different exponents;

iteratively performing, by the controller of the server, a process of obtaining function values by applying an iterating function to the initial values until the function values correspond to previously set distinguished points; and storing the function values corresponding to the previously set distinguished points and exponents of the function values in the pre-computation table.

7. The method of claim 6, wherein the previously set distinguished points are the function values having a predetermined number of most significant bits as 0.

8. The method of claim 6, wherein the iterative performing comprises:

performing the process of obtaining function values until a previously set iterating number is reached, and if the function values do not correspond to the previously set distinguished points, discarding chains of the function value with respect to the corresponding initial value.

9. An apparatus for generating a pre-computation table, the apparatus comprising:

an initial value generator which sets a predetermined number of initial values which have a generator of a cyclic group as a base and which have different exponents;

a function value calculator which obtains function values by applying an iterating function to the initial values;

a distinguished point determining unit which, if the function values correspond to previously set distinguished points, stores the function values and exponents of the function values in the pre-computation table.

10. A non-transitory computer readable recording medium having recorded thereon a computer program for executing a method of generating a pre-computation table, and computing a discrete logarithm based on the pre-computation table, the method comprising:

setting, by a controller of the server, p−1 and q−1 so that each p−1 and q−1 has at least one prime factor larger than B bits and N=pq is used as a modulus in the computing of the discrete logarithm, and both p and q are primes;

generating, by the controller of the server, the pre-computation table consisting of chains of function values obtained by applying an iterating function to a predetermined number of initial values having a generator of the cyclic group as a base and having different exponents; and if a first function value obtained by applying the iterating function to a value having a target element as a base and having an exponent is identical to a second function value stored in the pre-computation table, computing the discrete logarithm of the target element by using exponent information of the first function value and the second function value, wherein the B bits are a predetermined number of bits relating to a secret key.

11. A non-transitory computer readable recording medium having recorded thereon a computer program for executing a method of generating a pre-computation table used to compute a discrete logarithm, the method comprising:

setting, by a controller of the server, a predetermined number of initial values having a generator of a cyclic group as a base and having different exponents;

iteratively performing, by the controller of the server, a process of obtaining function values by applying an iterating function to the initial values until the function values correspond to previously set distinguished points; and storing the function values corresponding to the previously set distinguished points and exponents of the function values in the pre-computation table.

12. A computer apparatus, comprising:

a transmitter, a storage, and a function calculator;

the function calculator being configured to generate a secret key corresponding to a public key by using a pre-computation table having chains of function values obtained by applying an iterating function to a predetermined number of initial values having a generator of a cyclic group as a base and having different exponents, the pre-computation table being stored in the storage;

the function calculator being further configured to set p−1 and q−1 of the cyclic group having N=pq as a modulo, where p and q are prime numbers, as multiples of a prime factor of a predetermined number of B-smooth numbers, and other prime factors smaller than a B/2-smooth number;

wherein, when a first function value obtained by applying the iterating function to a value which has a target element as a base and which has an exponent is identical to a second function value stored in the pre-computation table, the function calculator computes the discrete logarithm of the target element using exponent information of the first function value and the second function value, whereby the discrete logarithm is used to generate the secret key; and wherein the computing apparatus outputs a secret key using the transmitter.

\* \* \* \* \*